(12) United States Patent
Gotoh (10) Patent No.: US 11,017,431 B2
(45) Date of Patent: May 25, 2021

(54) INFORMATION PROCESSING APPARATUS AND INFORMATION PROCESSING METHOD

(71) Applicant: SONY CORPORATION, Tokyo (JP)

(72) Inventor: Tomohiko Gotoh, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 63 days.

(21) Appl. No.: 15/777,546

(22) PCT Filed: Sep. 2, 2016

(86) PCT No.: PCT/JP2016/075825
§ 371 (c)(1),
(2) Date: May 18, 2018

(87) PCT Pub. No.: WO2017/094306
PCT Pub. Date: Jun. 8, 2017

(65) Prior Publication Data
US 2018/0341982 A1  Nov. 29, 2018

(30) Foreign Application Priority Data

Dec. 1, 2015 (JP) .............................. JP2015-234976

(51) Int. Cl.
*G06Q 30/00* (2012.01)
*G06Q 30/02* (2012.01)
(Continued)

(52) U.S. Cl.
CPC ....... *G06Q 30/0256* (2013.01); *G01C 21/206* (2013.01); *G01C 21/26* (2013.01);
(Continued)

(58) Field of Classification Search
None
See application file for complete search history.

(56) References Cited

U.S. PATENT DOCUMENTS 9,304,736 B1 * 4/2016 Whiteley .......... G06Q 20/40145
9,955,297 B2 * 4/2018 Kostka ..................... H04W 4/30
(Continued)

FOREIGN PATENT DOCUMENTS

CN          1713242 A     12/2005
CN        103002156 A      3/2013
(Continued)

OTHER PUBLICATIONS

Dwayne Adams, The evolution of digital signage marketing strategy, Aug. 25, 2014, www.patriot-tech.com (Year: 2014).*
(Continued)

*Primary Examiner* — Naresh Vig
(74) *Attorney, Agent, or Firm* — Chip Law Group (57) ABSTRACT

Provided as an information processing apparatus that includes: a search unit to search for, on a basis of position information of a user, a predetermined point specified in accordance with a user status and scenario progress from surroundings of a user; and an output control unit that performs control in a manner that a voice of a character corresponding to the scenario progress performs guidance to the predetermined point that has been searched.

12 Claims, 4 Drawing Sheets

(51) Int. Cl.
*G08G 1/005* (2006.01)
*G09F 19/00* (2006.01)
*G01C 21/26* (2006.01)
*G01C 21/20* (2006.01)
*G01C 21/34* (2006.01)
*H04S 3/00* (2006.01)
*H04R 1/10* (2006.01)
*H04S 1/00* (2006.01)
*H04S 7/00* (2006.01)

(52) U.S. Cl.
CPC ......... *G01C 21/3476* (2013.01); *G08G 1/005* (2013.01); *G09F 19/00* (2013.01); *H04S 3/008* (2013.01); *H04R 1/10* (2013.01); *H04R 2201/107* (2013.01); *H04R 2460/07* (2013.01); *H04S 1/007* (2013.01); *H04S 7/303* (2013.01); *H04S 2400/01* (2013.01); *H04S 2400/11* (2013.01)

(56) References Cited

U.S. PATENT DOCUMENTS

| | | | |
|---|---|---|---|
| 2008/0154606 | A1 | 6/2008 | Lee |
| 2008/0280730 | A1 | 11/2008 | Alexanderson |
| 2009/0091571 | A1* | 4/2009 | Zalewski ............... G06Q 30/02 345/427 |
| 2009/0192707 | A1* | 7/2009 | Nakatsuka ......... G01C 21/3629 701/431 |
| 2015/0332287 | A1* | 11/2015 | Arroyo ............... G06F 16/9535 705/7.26 |
| 2016/0063551 | A1* | 3/2016 | Yankovich ......... G06Q 30/0643 705/14.54 |
| 2016/0300392 | A1* | 10/2016 | Jonczyk ................ G06T 19/003 |
| 2017/0109796 | A1* | 4/2017 | Rahle ................ G06Q 30/0272 |
| 2018/0376170 | A1* | 12/2018 | Lin ...................... G06Q 10/101 |

FOREIGN PATENT DOCUMENTS

| | | |
|---|---|---|
| CN | 103674035 A | 3/2014 |
| CN | 103686613 A | 3/2014 |
| JP | 2000-193473 A | 7/2000 |
| JP | 2003-134510 A | 5/2003 |
| JP | 2003-204481 A | 7/2003 |
| JP | 2005-055666 A | 3/2005 |
| JP | 2008-275519 A | 11/2008 |
| JP | 2012-063253 A | 3/2012 |
| JP | 2012-079036 A | 4/2012 |
| WO | 2006/075606 A1 | 7/2006 |
| WO | 2008/139254 A1 | 11/2008 |

OTHER PUBLICATIONS

Jonczyk et al., U.S. Appl. No. 61/145,941, filed Apr. 10, 2015 (Year: 2015).*

International Search Report and Written Opinion of PCT Application No. PCT/JP2016/075825, dated Nov. 15, 2016, 09 pages of ISRWO.

Office Action for CN Patent Application No. 201680068969.X, dated Apr. 2, 2020, 10 pages of Office Action and 12 pages of English Translation.

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/075825 filed on Sep. 2, 2016, which claims priority benefit of Japanese Patent Application No. JP 2015-234976 filed in the Japan Patent Office on Dec. 1, 2015. Each of the above-referenced applications is hereby incorporated herein by reference in its entirety.

TECHNICAL FIELD

The present invention relates to an information processing apparatus, an information processing method, and a program.

BACKGROUND ART

With the recent developments in information processing and information communication technology, computers have been in widespread use, and have also been actively used in everyday life. For example, it becomes possible to view information on a network or receive the benefits of a navigation service to a destination when being out, by using mobile communication terminals such as smartphones and cellular phone terminals.

Regarding navigation technology using a cellular phone terminal, Patent Literature 1 proposes, for example, an information processing system that outputs to a user, from a speaker, a synthesized voice that has been synthesized so that a guidance voice can be heard from a direction of a guidance target object that is present in the surroundings.

CITATION LIST

Patent Literature

Patent Literature 1: JP 2008-275519A

DISCLOSURE OF INVENTION

Technical Problem

However, in Patent Literature 1, whether a user follows guidance to a destination place depends on whether the user himself/herself has a motivation to go to the destination place, and the user does not necessarily move to the destination place every time the guidance is performed. Therefore, there has been a possibility that the effects of using navigation technology for an advertisement are limitative, for example.

Accordingly, the present disclosure proposes an information processing apparatus, an information processing method, and a program which are capable of causing a user to be motivated to follow guidance to a predetermined place.

Solution to Problem

According to the present disclosure, there is proposed an information processing apparatus including: a search unit configured to search for, on a basis of position information of a user, a predetermined point specified in accordance with a user status and scenario progress from surroundings of a user; and an output control unit configured to perform control in a manner that a voice of a character corresponding to the scenario progress performs guidance to the predetermined point that has been searched for.

According to the present disclosure, there is proposed an information processing method performed by a processor, the method including: searching for, on a basis of position information of a user, a predetermined point specified in accordance with a user status and scenario progress from surroundings of a user; and performing control in a manner that a voice of a character corresponding to the scenario progress performs guidance to the predetermined point that has been searched for.

According to the present disclosure, there is proposed a program for causing a computer to function as a search unit configured to search for, on a basis of position information of a user, a predetermined point specified in accordance with a user status and scenario progress from surroundings of a user, and an output control unit configured to perform control in a manner that a voice of a character corresponding to the scenario progress performs guidance to the predetermined point that has been searched for.

Advantageous Effects of Invention

According to the present disclosure as described above, it becomes possible to cause a user to be motivated to follow guidance to a predetermined place.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will be given in the following order.

1. Overview of information processing apparatus according to embodiment of present disclosure
2. Example of internal configuration
3. Operation processing
4. Conclusion

Figure 1:
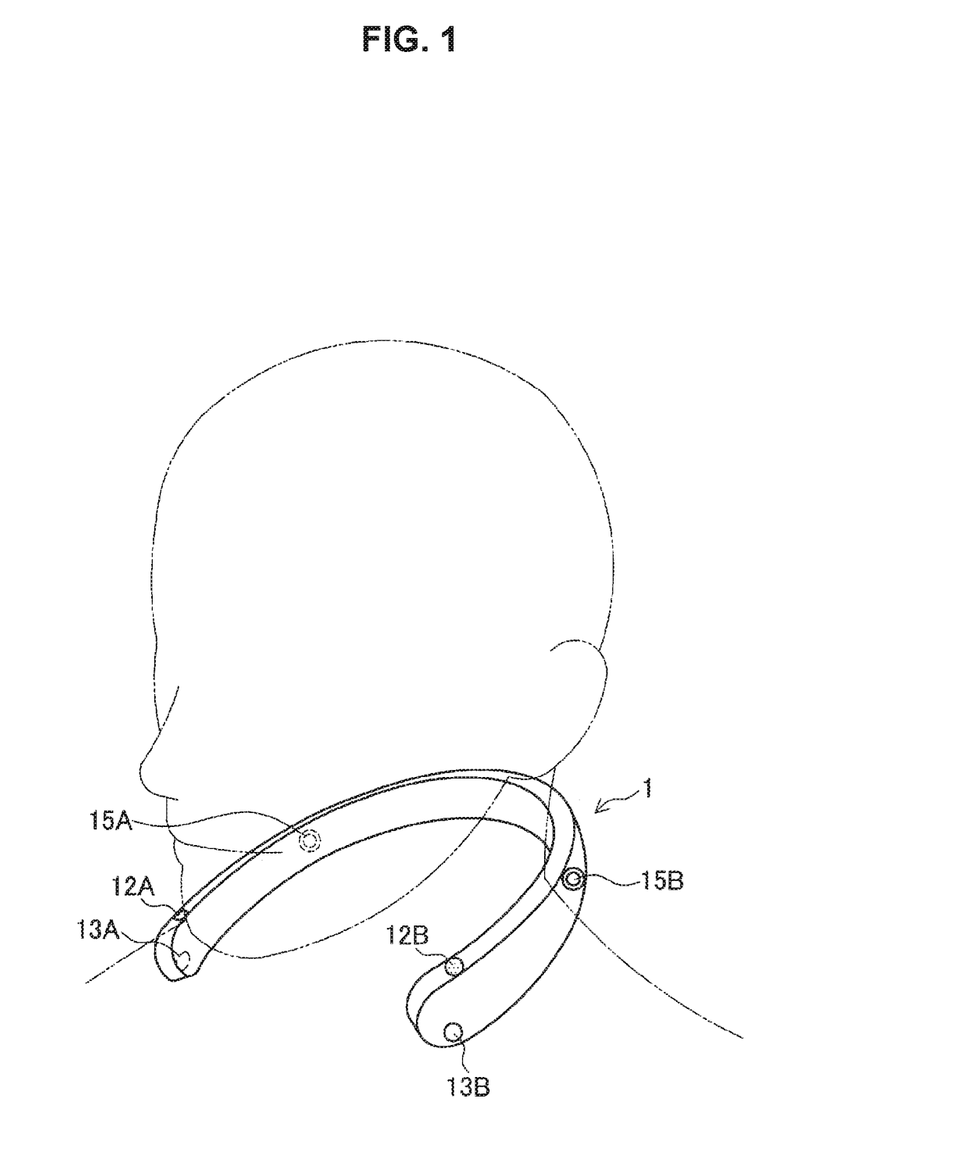
FIG. 1 is a perspective view showing an example of an external configuration of an information processing apparatus according to the present embodiment.

1. Overview of Information Processing Apparatus According to Embodiment of Present Disclosure First, with reference to FIG. 1, an overview of an information processing apparatus according to an embodiment of the present disclosure will be described. FIG. 1 is a perspective view showing an example of an external configuration of an information processing apparatus according to the present embodiment.

As shown in FIG. 1, an information processing apparatus 1 according to the present embodiment may be an information processing terminal of a neckband type that can be hooked around the neck of the user. The neckband-type information processing apparatus 1 has a mounting unit having a shape that goes halfway around the neck, from a side of the neck to the other side of the neck through the back side, and is mounted on the user by being hooked around the neck of the user. FIG. 1 shows a perspective view of a state in which the mounting unit is mounted on the user. Note that, in this description, the words indicating directions such as up, down, left, right, front, and back are used, and those directions indicate directions seen from the center of the body of the user (for example, the position of the pit of the stomach) when the user is in the standing posture. For example, "right" indicates the direction of the right side of the body of the user, "left" indicates the direction of the left side of the body of the user, "up" indicates the direction of the head side of the user, and "down" indicates the direction of the foot side of the user. Further, "front" indicates the direction that the body of the user looks, and "back" indicates the direction of the back of the user.

As shown in FIG. 1, the mounting unit may be mounted by being stuck to the neck of the user or may be mounted in a manner that there is a space between the neck of the user and the mounting unit. Other shapes of the mounting unit of a neck hooked type include, for example, a pendant type which is mounted on the user using a neck strap and a headset type having a neck band that fits along the back of the neck instead of a head band that fits on the head.

Further, the mounting unit may be used in a usage style of being directly mounted on the human body. The usage style of being directly mounted indicates a style of being used in a state in which no object is present between the mounting unit and the human body. For example, the case in which the mounting unit shown in FIG. 1 is being mounted so as to be in contact with the neck of the user corresponds to the present style. There are also various other styles such as a headset type and a glasses type which are being directly mounted on the head. Alternatively, the usage style of the mounting unit may also be a usage style of being indirectly mounted on the human body. The usage style of being indirectly mounted indicates a style of being used in a state in which some kind of object is present between the mounting unit and the human body. For example, the case in which the mounting unit shown in FIG. 1 is being mounted so that clothes are sandwiched between the mounting unit and the user, like the case in which the mounting unit is hidden under a collar of a shirt. In addition, there are various other styles such as a pendant type which is mounted on the user using a neck strap and a brooch type which can be pinned to the clothes with a clip or the like.

Further, the information processing apparatus 1 according to the present embodiment includes a plurality of microphones 12 (12A, 12B), a plurality of cameras 13 (13A, 13B), and a plurality of speakers 15 (15A, 15B). The microphones 12 acquire audio data such as a user's voice or a surrounding environmental sound. The cameras 13 image the surroundings and acquire imaging data. Further, the speakers 15 play back the audio data. In particular, the speakers 15 play back an audio signal subjected to sound image localization processing so as to cause a user to feel as if a virtual character (an example of a virtual object) is actually present in a real space. That is, the information processing apparatus 1 according to the present embodiment has a function of causing a user to feel as if a virtual character is actually present in the real space by using the sound image localization technology that spatially arranges audio information, and, by presenting guidance information to a predetermined place using a voice of the virtual character, is capable of causing a user to be motivated to follow the guidance.

As described above, in order for the user to follow the guidance to the destination place, it is necessary that the user himself/herself is motivated to do so, and since the user does not necessarily move to the destination place, there has been a possibility that the effects in the case of using navigation technology for an advertisement or the like, for example, are limitative.

Further, even if the user follows the guidance and moves to the destination place or purchases an object product, a second visit cannot be expected since no incentive is provided to the user. Further, advertisement guidance to a place that the user already knows or presentation of advertisement information that the user already knows is determined as information unnecessary for the user, and the motivation to follow the guidance is decreased.

Accordingly, the present embodiment makes it possible for the user to naturally increase the motivation by performing guidance to a predetermined place or suggesting purchasing a product as an event of a game using a voice of a character that appears in a game which is linked to an action of the user in the real world. Further, a user who has followed guidance can be given a motive to continuously receive information presentation and to follow guidance, by being given a reward for completing an event.

While enjoying the game which is linked to the real world, the user is naturally led to a place and a shop of an advertisement and purchase of a product, and performs an action in accordance with the advertisement in a style that the user respond to a request of the character in the game. Therefore, the motivation is increased to follow guidance to a place that the user already knows. In this manner, advertisement effects can be increased by giving the user the new motivation of achieving a sense of accomplishment of the game.

Note that the setting positions and the number of the microphones 12, the cameras 13, and the speakers 15 of the information processing apparatus 1 are not limited to the example shown in FIG. 1.

2. Example of Internal Configuration

Figure 2:
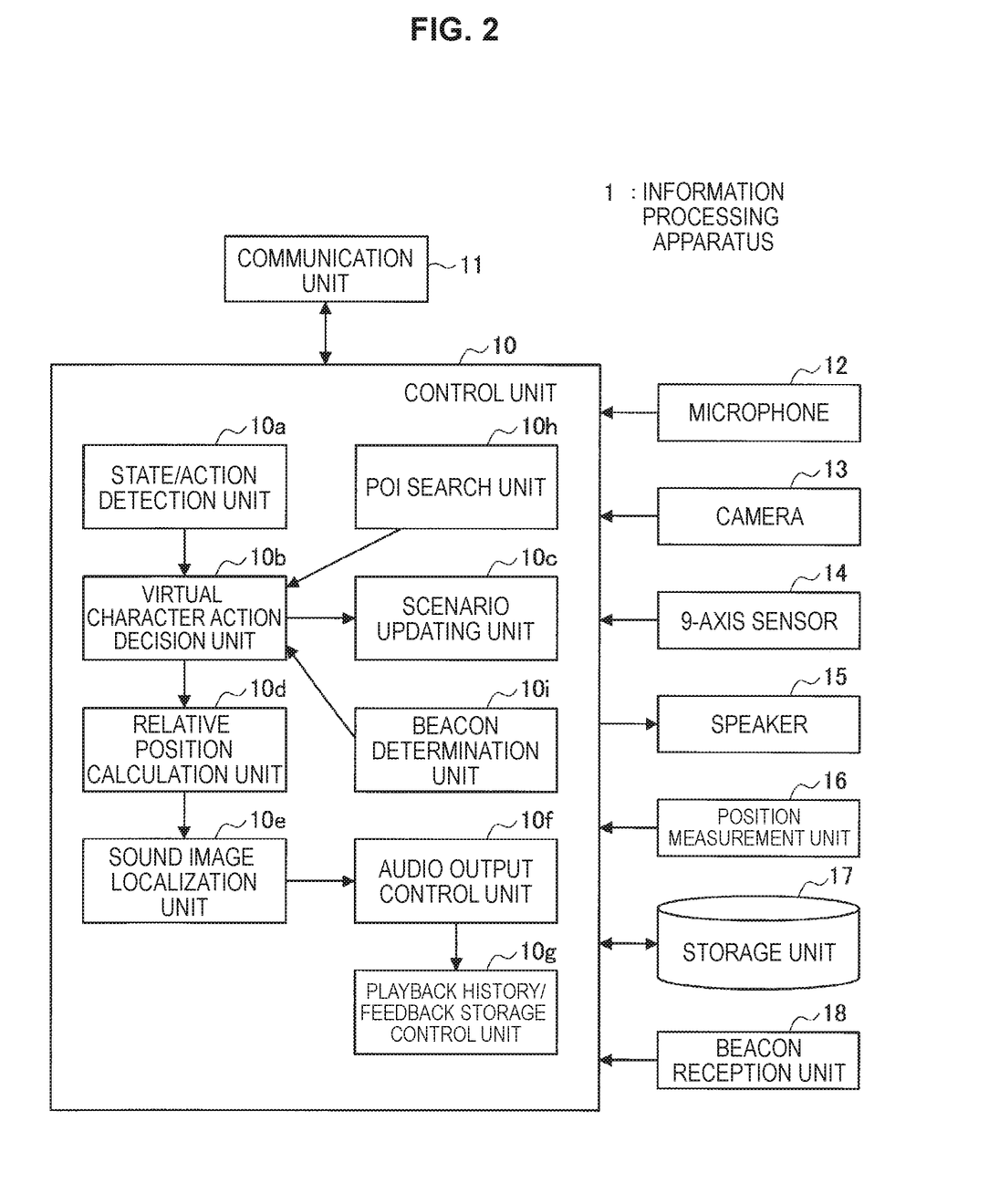
FIG. 2 is a block diagram showing an example of an internal configuration of the information processing apparatus according to the present embodiment.

Subsequently, with reference to FIG. 2, an internal configuration of the information processing apparatus 1 according to the present embodiment will be described. FIG. 2 is a block diagram showing an example of an internal configuration of the information processing apparatus 1 according to the present embodiment. As shown in FIG. 2, the information processing apparatus 1 includes a control unit 10, a communication unit 11, a microphone 12, a camera 13, a 9-axis sensor 14, a speaker 15, a position measurement unit 16, a storage unit 17, and a beacon reception unit 18.

(Control Unit 10)

The control unit 10 functions as an arithmetic processing device and a control device, and controls entire operation of the information processing apparatus 1 in accordance with various programs. The control unit 10 is achieved by, for example, a central processing unit (CPU) and an electronic circuit such as a microprocessor. Further, the control unit 10 may include read only memory (ROM) that stores a program, a calculation parameter, and the like to be used, and random access memory (RAM) that temporarily stores a parameter varying as appropriate and the like.

Further, the control unit 10 according to the present embodiment functions as, as shown in FIG. 2, a state/action detection unit 10a, a virtual character action decision unit 10b, a scenario updating unit 10c, a relative position calculation unit 10d, a sound image localization unit 10e, an audio output control unit 10f, a playback history/feedback storage control unit 10g, a beacon determination unit 10i, and a POI search unit 10h.

The state/action detection unit 10a performs detection of a state of a user and recognition of an action based on the detected state, and outputs the detected state and the recognized action to the virtual character action decision unit 10b. To be specific, the state/action detection unit 10a acquires, as information related to the state of the user, position information and information including moving speed, an orientation, and a height of the ears (or the head). The user state can be uniquely specified at the time of detection, and is information that can be calculated and acquired as a numerical value from various sensors.

The position information is acquired from, for example, the position measurement unit 16. Further, the moving speed is acquired from, for example, the position measurement unit 16, an acceleration sensor included in the 9-axis sensor 14, the camera 13, or the like. The orientation is acquired by a gyro sensor, the acceleration sensor, and a geomagnetic sensor included in the 9-axis sensor 14, or the camera 13. The height of the ears (or the head) is acquired from body size data of the user, the acceleration sensor, and the gyro sensor. The body size data of the user is stored in the storage unit 17. Further, the moving speed and the orientation may be acquired using simultaneous localization and mapping (SLAM) for calculating a motion on the basis of changes in feature points in a video obtained by continuously imaging the surroundings by the camera 13.

Further, the state/action detection unit 10a is also capable of recognizing a user action by referring to the states before and after. Assumed as the user actions are, for example, "stop", "walking", "running", "seated", "lying", "riding in a car", "cycling", "looking in a direction of a character", and the like. The state/action detection unit 10a is also capable of recognizing a user action by using a predetermined action recognition engine on the basis of information detected by the 9-axis sensor 14 (the acceleration sensor, the gyro sensor, and the geomagnetic sensor) and position information detected by the position measurement unit 16.

The virtual character action decision unit 10b decides a virtual action of a virtual character in a real space (including selecting a scenario), and selects sound content corresponding to the decided action from the scenario, on the basis of the state or the action of the user recognized by the state/action detection unit 10a. For example, the virtual character action decision unit 10b selects, when the user is on his/her way home from work and walking from a station, a mission of leading the user to a shop that sells an advertised product from a scenario.

Further, the virtual character action decision unit 10b may decide an action of the virtual character in accordance with, in addition to the state and the action of the user, a place (a current point of the user), time, weather, an environment, or the like, and may develop the scenario.

Further, when the action of the virtual character is decided, the virtual character action decision unit 10b selects a sound source corresponding to the action of the virtual character from a sound source list (pieces of sound content) which is stored in advance as a scenario of content.

In accordance with sound content corresponding to the action of the virtual character decided by the virtual character action decision unit 10b being selected from a scenario, the scenario updating unit 10c performs updating of a scenario corresponding to the user. The scenario is stored in the storage unit 17, for example. The scenario is composed of a plurality of chapters, for example, each chapter is composed of a plurality of missions, and, in the case where all the missions are completed, one chapter may be finished and the next chapter may be started.

Figure 3:
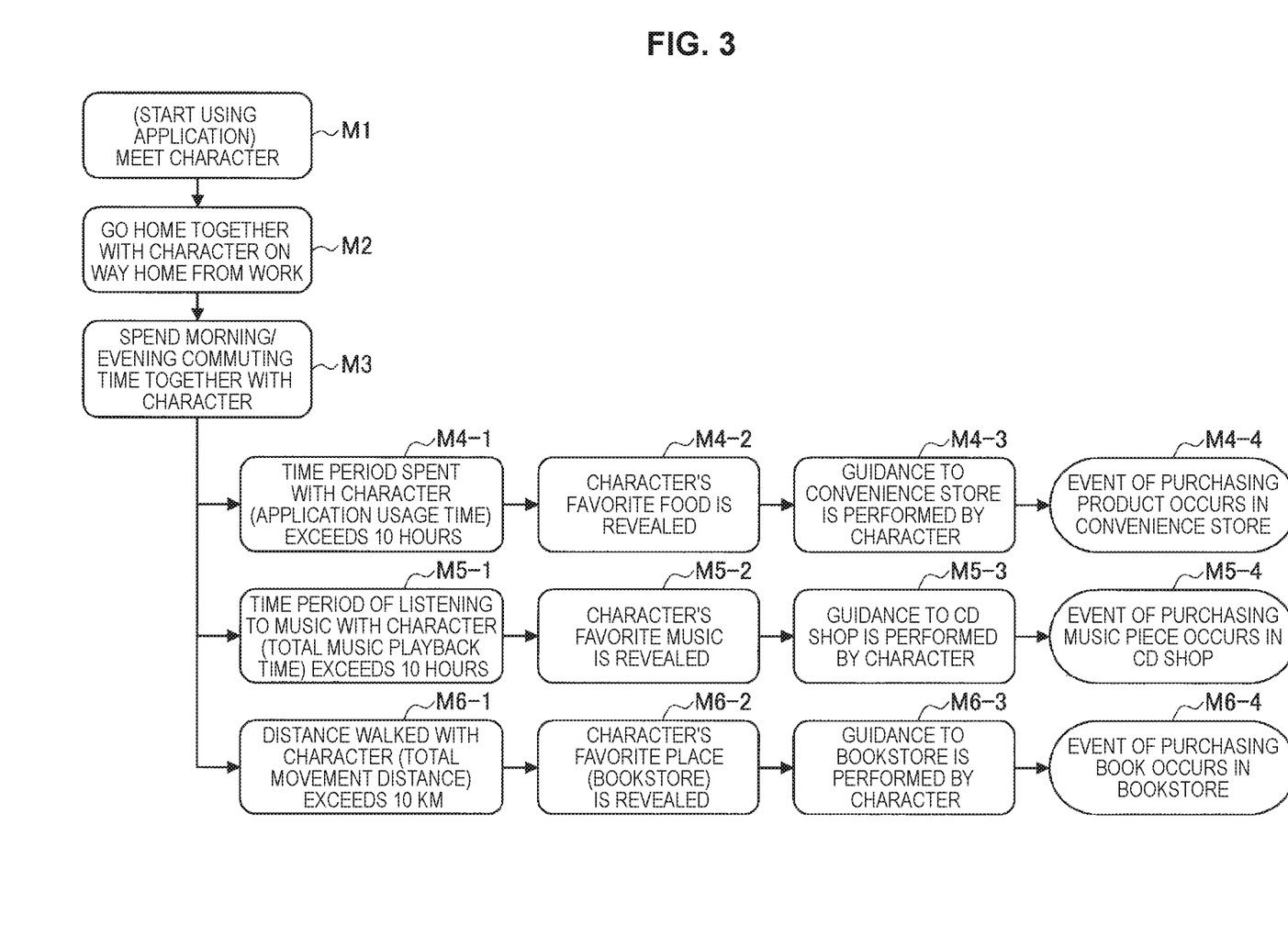
FIG. 3 is a diagram showing an example of scenario proceedings according to the present embodiment.

Here, with reference to FIG. 3, an example of scenario proceedings will be described. FIG. 3 is a diagram showing an example of scenario proceedings according to the present embodiment. As shown in FIG. 3, for example, at a time point at which the use of an application for executing the present embodiment is started, a mission M1 in which a user meets a character is executed. To be specific, for example, a self-introduction is performed with a voice of the character corresponding to the mission M1. Next, a mission M2 in which the user goes home together with the character on his/her way home from work is executed. To be specific, on the basis of an action recognition result of the user, for example, while the user is walking from a station to his/her home on his/her way home from work, the character is also walking next to the user (expressed by the sound of footsteps), and audio output of a voice (life stories, for example) corresponding to the mission M2 is performed. Next, a mission M3 in which the user spends morning and evening commuting time together with the character is executed. To be specific, on the basis of an action recognition result of the user, for example, while the user is commuting by train, the audio output is performed such that the character also commutes with the user and talks to the user.

Next, as shown in FIG. 3, a mission M4 including missions M4-1 to M4-4, a mission M5 including missions M5-1 to M5-4, and a mission M6 including missions M6-1 to M6-4 are each executed in accordance with a game progress status. For example, in the case where the time period spent with the character (that is, application usage (elapsed) time) exceeds a predetermined time period (for example, 10 hours) (the mission M4-1 is completed), a product that the character likes (for example, "croquette") is revealed by the character (the mission M4-2 is executed). To be specific, a product selected from advertised products in accordance with situations (date/time, a place, weather, an environment, a preference of the user, and the like) is introduced to the user with the voice of the character, as a product that the character likes. Next, with the voice of the character, advertisement guidance to a specific shop that sells the croquette is performed (the mission M4-3 is executed). For example, a voice saying, "That convenience store behind a right-hand bend sells my favorite croquette! Can you come with me?" with the voice of the character is output to the user. In this manner, even if the user already knows the place or is not motivated to buy the croquette, the user is expected to naturally follow the guidance and move to the place for completing the game event or for granting the request of the character, which the user has spent a long time with and which the user has increased attachment to. Next, in the case where the user follows the guidance and moves to the specific shop, an event occurs that an advertised product (here, a food that the character likes) is purchased at the shop (the mission M4-4 is executed). To be specific, for example, when the user follows the voice guidance of the character and moves to the shelf that the target product is displayed, the character's voice says, "This one is delicious! It's a seasonal limited product!" performing product explanation and recommendation of the product, and makes the user motivated to purchase the product.

The mission M4 including the above-mentioned missions M4-1 to M4-4 advertises a food as an example of the advertised products, however, the present embodiment is not limited thereto, and a music CD may be advertised like the mission M5 including the missions M5-1 to M5-4, or a book may be advertised like the mission M6 including the missions M6-1 to M6-4.

Heretofore, an example of the scenario according to the present embodiment has been described.

The relative position calculation unit 10d calculates a relative three-dimensional position (xy coordinate position and height) that localizes a sound source (sound content) of the virtual character selected by the virtual character action decision unit 10b. To be specific, the relative position calculation unit 10d calculates a relative position with respect to the user of parts (head, body, foot, and the like) of the virtual character corresponding to types (voice, rustling of clothes, footsteps, and the like) of the sound source. Further, the relative position calculation unit 10d may calculate a relative position in a manner that the voice of the character is heard from a direction of guidance. For example, when guidance to a convenience store is performed, it is assumed that the character's voice saying, "It's over here!" can be heard from the road that leads to the convenience store. Further, the relative position calculation unit 10d may calculate a relative positon also taking into account the height of the ears (or the head) and the orientation of the user, the height of the virtual character, and the like. In this manner, a sound image localization position (localization direction and distance with respect to the user) is calculated in accordance with the action and the speech of the virtual character such that a feeling of strangeness does not occur in the case where it is assumed that the virtual character is present and acts in the real space, and the presence of the virtual character can be exhibited with increased reality.

The sound image localization unit 10e performs audio signal processing on sound content such that, at a sound image localization position for each piece of sound content calculated by the relative position calculation unit 10d, the corresponding sound content (sound source) selected by the virtual character action decision unit 10b.

The audio output control unit 10f performs control such that the audio signal processed by the sound image localization unit 10e is played back by the speaker 15. In this manner, the information processing apparatus 1 according to the present embodiment can perform sound image localization on the sound content corresponding to a motion of the virtual character corresponding to a state/action of the user at a position, a distance, and a height appropriate for the user, thereby presenting reality of the motion and the size of the virtual character, and can increase the presence of the virtual character in the real space.

The playback history/feedback storage control unit 10g performs control such that the sound source (sound content), the audio output of which is performed by the audio output control unit 10f, is stored in the storage unit 17 as a history (playback log). Further, the playback history/feedback storage control unit 10g performs control such that reactions of the user, for example, turning his/her face in the direction of a voice, stopping and listening to a talk, and nodding when audio output is performed by the audio output control unit 10f, are stored as feedback in the storage unit 17. In this manner, the control unit 10 can learn the user's preference, and can select a mission or an advertised product corresponding to the user's preference in the above-mentioned virtual character action decision unit 10b.

The POI search unit 10h searches for a point of interest (POI) of the surroundings of the user on the basis of position information of the user. To be specific, in accordance with scenario progress, in the case where the scenario proceeds to a mission in which the user is led to a specific place, for example, the POI search unit 10h searches for the specific place from the surroundings of the user, and outputs the search result to the virtual character action decision unit 10b.

The beacon determination unit 10i determines whether a beacon is received by the beacon reception unit 18. For example, in the case where the user follows guidance and moves inside a shop, it is necessary to further determine whether the user comes near an advertised product that is displayed inside the shop; however, there are some cases that an accuracy of acquisition of position information at indoors performed by the position measurement unit 16 may be low. Accordingly, the present embodiment makes it possible to acquire the position information at indoors by receiving, by the beacon reception unit 18, a beacon transmitted from a beacon terminal installed at a shelf that the target product is displayed or the like. The beacon determination unit 10i determines whether the user comes near a predetermined advertised product in accordance with whether a predetermined beacon is received by the beacon reception unit 18, and outputs the determination result to the virtual character action decision unit 10b. In this manner, in the case where the user moves near the predetermined advertised product, the virtual character action decision unit 10b can select a mission of recommending the product to the user.

(Communication Unit 11)

The communication unit 11 is a communication module for performing transmission and reception of data with another device via wire/radio. The communication unit 11 communicates directly or via radio through a network access point with an external device using, for example, a scheme such as a wired local area network (LAN), a wireless LAN, Wireless Fidelity (Wi-Fi, registered trademark), infrared communication, Bluetooth (registered trademark), and near-field non-contact communication.

Note that, in the case where each of the functions of the control unit 10 described above is included in an external device such as a smartphone or a server on the cloud, the communication unit 11 transmits data acquired by the microphone 12, the camera 13, and the 9-axis sensor 14 to the external device. Further, for example, in the case where the microphone 12, the camera 13, or the 9-axis sensor 14 is provided to a smartphone or another wearable device, the communication unit 11 may receive various pieces of sensor data from the smartphone or the other wearable device and output the pieces of sensor data to the control unit 10. Further, the communication unit 11 may also receive sound content selected by the control unit 10 from a server on the cloud or the like.

(Microphone 12)

The microphone 12 collects a voice of the user or a sound of a surrounding environment, and outputs the collected sound to the control unit 10 as audio data.

(Camera 13)

The camera 13 has a lens system including an imaging lens, a diaphragm, a zoom lens, a focus lens, and the like, a drive system that causes the lens system to perform focus operation and zoom operation, a solid-state image sensor array that performs photoelectric conversion on imaging light obtained in the lens system and generates an imaging signal, and the like. The solid-state image sensor array may be achieved by, for example, a charge coupled device (CCD) sensor array or a complementary metal oxide semiconductor (CMOS) sensor array. For example, the camera 13 is provided in a manner that the front side of the user can be imaged in a state that the information processing apparatus 1 (mounting unit) is mounted on the user. In this case, the camera 13 can image movement of a surrounding scene corresponding to a motion of the user or a shelf on which products are displayed in a direction that the user looks in a shop, for example. Further, the camera 13 may be provided in a manner that the face of the user can be imaged in a state that the information processing apparatus 1 is mounted on the user. In this case, the information processing apparatus 1 can specify a position of the user's ears and an expression of the user from a captured image. Further, the camera 13 can output data of the captured image which has been converted into a digital signal to the control unit 10.

(9-Axis Sensor 14)

The 9-axis sensor 14 includes a 3-axis gyro sensor (which detects angular velocity (rotation speed)), a 3-axis acceleration sensor (also referred to as G sensor, which detects acceleration at the time of moving), and a 3-axis geomagnetic sensor (a compass, which detects an absolute direction (azimuth)). The 9-axis sensor 14 has a function of sensing a state of the user on which the information processing apparatus 1 is mounted or a state of the surroundings. Note that the 9-axis sensor 14 is an example of a sensor unit, and the present embodiment is not limited thereto; for example, the present embodiment may further use a speed sensor, a vibration sensor, or the like, and may also use at least one of the acceleration sensor, the gyro sensor, and the geomagnetic sensor. Further, the sensor unit may be provided to a device other than the information processing apparatus 1 (mounting unit), or may be provided in a dispersed manner to a plurality of devices. For example, the acceleration sensor, the gyro sensor, and the geomagnetic sensor may be provided to a device (for example, earphones) mounted on the head, and the speed sensor and the vibration sensor may be provided to the smartphone. The 9-axis sensor 14 outputs information indicating sensing results to the control unit 10.

(Speaker 15)

The speaker 15 plays back an audio signal processed by the sound image localization unit 10e in accordance with control performed by the audio output control unit 10f. Further, the speaker 15 can also convert a plurality of sound sources of any positions/directions into stereophonic sounds and output the stereophonic sounds.

(Position Measurement Unit 16)

The position measurement unit 16 has a function of detecting a current position of the information processing apparatus 1 on the basis of an acquired signal from an outside. To be specific, for example, the position measurement unit 16 is achieved by a global positioning system (GPS) measurement unit, receives radio waves from GPS satellites to thereby detect a position at which the information processing apparatus 1 is present, and outputs the detected position information to the control unit 10. Further, the information processing apparatus 1 may detect a position by, for example, Wi-Fi (registered trademark), Bluetooth (registered trademark), transmission/reception with mobile phones, PHS's, smartphones, or the like, near-field communication, or the like, in addition to the GPS.

(Storage Unit 17)

The storage unit 17 stores programs or parameters for the above-mentioned control unit 10 to execute the functions. Further, the storage unit 17 according to the present embodiment stores scenario (various pieces of sound content), setting information of the virtual character (shape, height, and the like), and user information (name, age, home, occupation, workplace, body size data, hobby/preference, and the like). Note that at least some of the pieces of information stored in the storage unit 17 may be stored in another device such as a server on the cloud.

(Beacon Reception Unit 18)

The beacon reception unit 18 receives a beacon transmitted from a beacon terminal that is present in the surroundings, and outputs the beacon to the control unit 10.

Heretofore, the internal configuration of the information processing apparatus 1 according to the present embodiment has been described specifically.

3. Operation Processing

Figure 4:
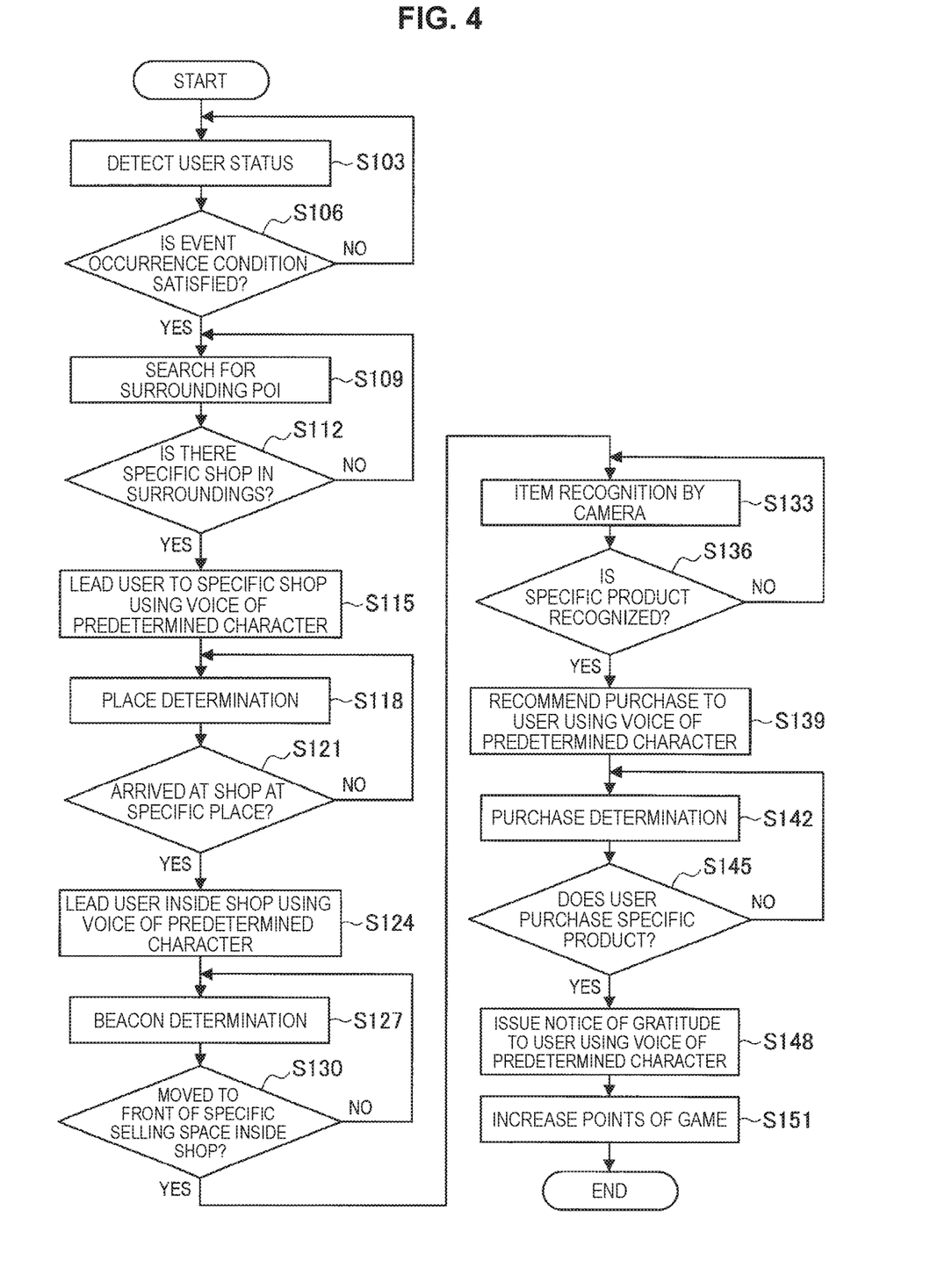
FIG. 4 is a flowchart showing operation processing of the information processing apparatus according to the present embodiment.

Subsequently, with reference to FIG. 4, the information processing apparatus 1 according to the present embodiment will be described. FIG. 4 is a flowchart showing operation processing according to the present embodiment.

As shown in FIG. 4, first, the state/action detection unit 10a of the information processing apparatus 1 detects a user status on the basis of information detected by various sensors (to be specific, the microphone 12, the camera 13, the 9-axis sensor 14, or the position measurement unit 16, for example) (step S103).

Next, the virtual character action decision unit 10b determines whether an event occurrence condition is satisfied on the basis of the user status detected by the state/action detection unit 10a (step S106). For example, the virtual character action decision unit 10b determines whether an occurrence condition of a predetermined event is satisfied in accordance with position information of the user and game scenario progress. For example, as the predetermined event, there can be given guidance to a shop in which a product to be advertised, guidance to a place at which an event to be advertised is being held, guidance to a place at which advertisement information to be viewed by the user is put up, guidance to a movie theater in which a movie to be advertised is showing, or guidance to a boarding and alighting place of transportation means to be advertised. In addition, there can be given guidance to a CD shop which has a music CD to be advertised (purchasing of the music piece may be performed through downloading), guidance to a place at which advertisement information to be viewed by the user is put up in the case where the user is taking a route different from a usual route, or the like.

Next, the POI search unit 10h searches for a POI that is present in the surroundings of a current position of the user (step S109).

Next, the virtual character action decision unit 10b determines whether there is a specific place (here, a shop, for example) corresponding to the event decided by the virtual character action decision unit 10b in the surroundings of the user, on the basis of the search result obtained by the POI search unit 10h (step S112). Note that the POI search unit 10h may be notified of the specific place corresponding to the event decided by the virtual character action decision unit 10b, and the POI search unit 10h may search for the specific place from the surroundings of the user.

Next, in the case where the specific shop is present in the surroundings of the user (step S112/Yes), the control unit 10 leads the user to the specific shop using a voice of a predetermined character in a scenario (step S115). To be specific, the control unit 10 causes the audio output control unit 10*f* to output, as needed, the voice of the predetermined character saying, "There is a convenience store nearby, let's go!", "Turn right here!", or "Straight ahead", from the speaker 15. In this case, the voice of the character output from the speaker 15 is controlled so as to be heard from the direction in which the convenience store is present. To be specific, the direction of the specific shop with respect to the current position of the user is calculated by the relative position calculation unit 10*d*, localization processing is performed by the sound image localization unit 10*e*, and output control is performed by the audio output control unit 10*f*. The relative position calculation unit 10*d* further takes into account the difference between the height of the user and the height of the virtual character, and calculates a position corresponding to the direction in which the specific shop is present and corresponding to the height difference (a lower position in the case where the height of the virtual character is lower than the height of the user, and a higher position in the case where the height of the virtual character is higher than the height of the user).

Next, the state/action detection unit 10*a* determines a place at which the user is currently present from position information that is continuously measured by the position measurement unit 16 (step S118).

Next, the virtual character action decision unit 10*b* determines whether the user arrives at the specific shop that is the guidance destination on the basis of the determination result obtained by the state/action detection unit 10*a* (step S121). Until the arrival, the voice guidance of the predetermined character may be continuously performed in accordance with the current position of the user.

Subsequently, in the case where the user arrives at the specific shop (step S121/Yes), the control unit 10 leads the user inside the shop using the voice of the predetermined character (step S124). For example, when it is recognized that the user is present near the specific shop, a voice that invites the user to go inside the shop saying, "It's this convenience store! Let's go inside!" or a voice that advertises a product saying, "The ice cream XX sold here is so delicious" is output using the voice of the predetermined character.

Next, when the user enters inside the shop, beacon determination is performed by the beacon determination unit 10*i* (step S127). Since there are some cases that an accuracy of detailed position information of the user inside the shop obtained by the position measurement unit 16 using the GPS or the like may be low, it is made possible to acquire position information inside the shop on the basis of beacon information transmitted from a beacon terminal provided inside the shop. Note that whether the user enters the shop may be determined on the basis of the beacon transmitted from a beacon terminal provided in the vicinity of the entrance of the shop.

Next, the control unit 10 determines whether the user moves to the front of a specific selling space inside the shop on the basis of the determination result obtained by the beacon determination unit 10*i* (step S130).

Next, in the case where it is determined that the user moves to the front of the specific selling space (step S130/Yes), the control unit 10 performs item recognition on the basis of a captured image obtained by the camera 13, and determines whether a specific advertised product is present in front of the user's eyes (within a field of view of the user) (steps S133 and S136).

Next, in the case where the specific product is recognized from the captured image (step S136/Yes), the control unit 10 recommends the purchase using the voice of the predetermined character (step S139). For example, the control unit 10 causes to output the voice of the predetermined character saying "This one! This ice cream is the delicious one!"

Next, the control unit 10 determines whether the user purchases the specific product (step S142). To be specific, for example, the control unit 10 performs the specific product-purchase determination by receiving on a real-time basis from a smartphone or the like information that the user has purchased the specific product through electronic payment using a smartphone or the like.

Next, in the case where the user purchases the specific product (step S145/Yes), the control unit 10 issues notice of gratitude to the user using the voice of the predetermined character (step S148). For example, voices saying, "Thank you!", "Let's eat now!", and "Delicious?" are output.

Then, completing the mission of purchasing the specific product, the control unit 10 updates the game scenario, and performs, as a reward therefor, addition of points of the game, granting of items, presentation of information for advancing advantageously in the game, or the like (step S151).

In the operation processing described above, the event that the purchase at the shop of the specific product to be advertised is executed, but the present embodiment is not limited thereto, and execution of the following events can be assumed, for example.

For example, when the control unit 10 performs guidance to a movie theater in which a movie to be advertised is showing and recommends acquisition of a discount coupon using a smartphone, and when the user acquires the discount coupon, the control unit 10 causes the voice of the predetermined character saying, "You can watch this movie at a discount!" to be output.

Further, in the case where the user comes near an advertisement (a poster or a signboard) to be viewed by the user, the control unit 10 causes the voice of the predetermined character saying, "Look at the poster at the top of that building on the right!" to be output.

Further, the control unit 10 determines whether transportation means to be advertised is being used on the basis of position information, acceleration sensor data, and the like, and causes the voice of the predetermined character saying, "Thank you for letting me ride on XX railway!" to be output.

Further, in the case where there is an event to be advertised, the control unit 10 causes the voice of the predetermined character saying, as an event of a game, "Come to XX park at 18:00 this Saturday." to be output.

Further, in the case where the user is in an amusement park, the control unit 10 causes the voice of the predetermined character saying, "XX attraction is less crowded now!" to be output on the basis of environment information of the surroundings.

Further, in the case where there is a movie to be advertised, the control unit 10 causes the voice of the predetermined character saying, as an event of a game, "The movie called XX looks excited! I have a discount coupon, so let's go and watch it!" to be output. The discount coupon may be acquirable by making a smartphone touch a predetermined terminal at the movie theater, for example.

Further, in the case where there is a sale to be advertised and it is currently rainy, the control unit 10 invites the user in the voice of the predetermined character saying, "Let's take shelter from the rain in XX shopping center", and, when the user enters the predetermined shopping center, advertises as follows, "The sale is on at XX!".

Further, in the case where information to be advertised is present near the user, the control unit 10 causes the voice of the predetermined character saying, "There is a poster of our CD called XX which will be released soon in that building in front of you." to be output, and when the target poster is being seen, causes the voice of the predetermined character saying, "Did you see the poster? That is a sweet that we advertise in the CM." to be output.

Further, in the case where there is transportation means or a place to be advertised, the control unit 10 causes the voice of the predetermined character saying, as an event of a game, "I want to ride on a tramcar in XX valley!" to be output, and when the user rides on the tramcar in XX valley, causes the voice of the predetermined character saying, "Super view! Thank you for taking me with you!" to be output.

Further, in the case where there is a tourism event to be advertised, the control unit 10 causes the voice of the predetermined character saying, "I will guide this town today." to be output, and performs guidance to various sites to see and gift shops.

Further, in the case where there is a book to be advertised, the control unit 10 causes the voice of the predetermined character saying, as an event of a game, "I want to go to a book shop." to be output, and, when the user goes to the target bookstore, causes the voice of the predetermined character saying, "I want a book of an asterism." to be output.

In the case where a product to be advertised is on a route that the user does not usually take, the control unit 10 causes the voice of the predetermined character saying, "Do you mind if you stop off somewhere on the way home?" to be output, and, when the user walks along a predetermined shopping street that the user usually does not walk along, causes the voice of the predetermined character saying, "The cake in here, it's really delicious!" to be output.

Further, in the case where there is a music piece to be advertised, the control unit 10 invites the user using the voice of the predetermined character saying, "I like the music piece called YY of the artist called XX. Would you like to listen to it with me?", and when the user purchases the target music from a music distribution service, causes the voice of the predetermined character saying, "Thank you! Let's listen to it together!" to be output.

Further, in the case where there is a photo sticker machine to be advertised, the control unit 10 invites the user using the voice of the predetermined character saying, "Let's take a photo with me", and leads the user to the shop that has a specific type of photo sticker machine. The specific type of photo sticker machine communicates with the information processing apparatus 1 that is mounted on the user, and can take a photograph in which the predetermined character is shown with the user in a photo sticker. In this manner, the figure of the virtual character, which is usually present only in a form of a voice, can be seen.

Further, in the case where the user purchases an advertised product, the control unit 10 causes the voice of the predetermined character saying, "Ah, you bought it! Thank you." to be output, and increases points showing the affinity with the character.

4. Conclusion

As described above, the information processing system according to an embodiment of the present disclosure is capable of causing a user to be motivated to follow guidance to a predetermined place.

Further, it is also possible to cause a user to feel the presence of a virtual character using a voice, and the user can respond to the voice of the virtual character with actions such as nodding, turning his/her face to the voice, moving, and purchasing a product; therefore, the user can enjoy a game which is linked to the real world without taking an unnatural action.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as CPU, ROM, and RAM built in the information processing apparatus 1 to exhibit the functions of the information processing apparatus 1. Further, there is also provided a computer readable storage medium having the computer program stored therein.

Further, the information processing apparatus 1 according to the present embodiment may be achieved by an information processing system including headphones (or earphones, an eyewear, or the like) in which the speaker 15 is provided and a mobile terminal (a smartphone or the like) mainly having the functions of the control unit 10. In this case, the mobile terminal transmits an audio signal subjected to sound image localization processing and causes the headphones to play back the audio signal. Further, the speaker 15 is not limited to the case of being mounted on a device to be mounted on the user, and may be achieved by an environment speaker installed in the surroundings of the user, for example. In this case, the environment speaker can perform sound image localization at any position in the surroundings of the user.

Further, although the presence of the virtual character is presented only by a voice in the embodiment described above, the present embodiment is not limited thereto. For example, in the case where the information processing apparatus 1 is an eyewear type, it is also possible to further increase the reality of the virtual character by combining the sound image localization according to the present embodiment with superimposition display of the virtual character video on the real space.

Further, the game scenario is not limited to the one that is set in advance, and the user can register a task as appropriate. For example, a task of dumping garbage on a predetermined day of the week at a predetermined time of the day may be registered, and, when the task is executed, a predetermined character may be seen at the dumping site.

Further, although the POI search and the generation of the guidance voice data are performed in the information processing apparatus 1 in the embodiment described above, the present embodiment is not limited thereto, and searching of user's surrounding information (to be specific, POI search) and generation of guidance voice data to a searched specific place may be performed at a server side, to and from which the information processing apparatus 1 is capable of transmitting and receiving data through the communication unit 11.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing apparatus including:
a search unit configured to search for, on a basis of position information of a user, a predetermined point specified in accordance with a user status and scenario progress from surroundings of a user; and
an output control unit configured to perform control in a manner that a voice of a character corresponding to the scenario progress performs guidance to the predetermined point that has been searched for.

(2)
The information processing apparatus according to (1), in which
the search unit searches for a place corresponding to an advertised object.

(3)
The information processing apparatus according to (1) or (2), in which
the predetermined point is specified further in accordance with a user's surrounding environment.

(4)
The information processing apparatus according to (2) or (3), further including:
a calculation unit configured to calculate a relative localization position of a sound source of the character with respect to the user, on a basis of information regarding the character which is a virtual object that is caused to be felt to be present in a real space using sound image localization and information regarding a state of the user; and
a sound image localization unit configured to perform audio signal processing on the sound source so as to localize a sound image at the calculated localization position.

(5)
The information processing apparatus according to (4), in which
the sound image localization unit performs processing in a manner that the voice of the character is heard from a direction in which the predetermined point that has been searched for is present.

(6)
The information processing apparatus according to any one of (2) to (5), further including:
an updating unit configured to update a scenario in accordance with an action of the user or time elapse.

(7)
The information processing apparatus according to any one of (2) to (6), further including:
a beacon reception unit configured to receive a beacon transmitted from a beacon terminal; and
a determination unit configured to determine whether a user has moved in a vicinity of the advertised object on a basis of the beacon received by the beacon reception unit.

(8)
The information processing apparatus according to any one of (2) to (7), in which
the information processing apparatus determines whether the advertised object is present within a field of view of a user on a basis of a captured image obtained by performing imaging of a direction of an eye line of the user.

(9)
The information processing apparatus according to (4), in which
the relative localization position of the sound image is a three-dimensional position including a height.

(10)
An information processing method performed by a processor, the method including:
searching for, on a basis of position information of a user, a predetermined point specified in accordance with a user status and scenario progress from surroundings of a user; and
performing control in a manner that a voice of a character corresponding to the scenario progress performs guidance to the predetermined point that has been searched for.

(11)
A program for causing a computer to function as
a search unit configured to search for, on a basis of position information of a user, a predetermined point specified in accordance with a user status and scenario progress from surroundings of a user, and
an output control unit configured to perform control in a manner that a voice of a character corresponding to the scenario progress performs guidance to the predetermined point that has been searched for.

REFERENCE SIGNS LIST 1 information processing apparatus
10 control unit
10a state/action detection unit
10b virtual character action decision unit
10c scenario updating unit
10d relative position calculation unit
10e sound image localization unit
10f audio output control unit
10g playback history/feedback storage control unit
10h POI search unit
10i beacon determination unit
11 communication unit
12 microphone
13 camera
14 9-axis sensor
15 speaker
16 position measurement unit
17 storage unit
18 beacon reception unit

The invention claimed is:
1. A neckband type information processing apparatus, comprising:
a circuitry configured to:
acquire sensor information, associated with a user, from a plurality of sensors;
detect user information in a real space based on the acquired sensor information,
wherein
the user information is associated with at least one of a state or an action of the user,
the user information includes at least one of position information of the user acquired from a position sensor of the plurality of sensors, or environment information of environment surrounding the user, and
the environment information is acquired from a camera of the plurality of sensors;
determine an action, of a virtual character in a virtual space, linked to the user information detected in the real space; and
control a voice of the virtual character from a speaker based on the determined action of the virtual character, wherein
the voice of the virtual character is controlled to indicate, to the user, an object (photo sticker machine) in the real space, the user information detected in the real space includes object information of the object, and the object is visible to the user in the real space.

2. The neckband type information processing apparatus according to claim 1, wherein the circuitry is further configured to search a place corresponding to the object.

3. The neckband type information processing apparatus according to claim 2, wherein the circuitry is further configured to:
calculate a relative localization position, of a sound source of the virtual character, with respect to the user, wherein the relative localization position is calculated based on virtual character information of the virtual character and the user information associated with the state of the user; and
execute an audio signal process on the sound source to localize a sound image at the calculated relative localization position.

4. The neckband type information processing apparatus according to claim 3, wherein the circuitry is further configured to control the voice of the virtual character such that the voice of the virtual character is heard, by the user, from a direction in which the object is present.

5. The neckband type information processing apparatus according to claim 2, wherein the circuitry is further configured to:
receive a beacon from a beacon terminal; and
determine a movement of the user is within proximity of the object based on the received beacon.

6. The neckband type information processing apparatus according to claim 3, wherein the calculated relative localization position of the sound image is a three-dimensional position that includes a height of the sound image.

7. The neckband type information processing apparatus according to claim 2, wherein the circuitry is further configured to:
acquire a captured image from the camera, wherein an imaging direction of the captured image corresponds to a direction of an eye of the user; and
determine the object is within a field of view of the user based on the captured image.

8. The neckband type information processing apparatus according to claim 2, wherein the circuitry is further configured to:
determine reception of a beacon from a beacon terminal; and
determine a movement of the user is within proximity of the object based on the determination of the reception of the beacon.

9. The neckband type information processing apparatus according to claim 1, wherein the circuitry is further configured to:
control the voice of the virtual character to indicate, to the user, a place corresponding to the object;
determine presence of the user at the indicated place; and
recommend purchase of the object to the user based on the presence of the user at the indicated place.

10. The neckband type information processing apparatus according to claim 1, wherein
the object is a photo sticker machine,
the information processing apparatus is communicatively coupled to the photo sticker machine, and
the circuitry is further configured to control the photo sticker machine to capture an image that includes the user and the virtual character.

11. An information processing method comprising:
acquiring sensor information associated with a user from a plurality of sensors of a user's neckband type information processing device;
detecting user information in a real space based on the acquired sensor information, wherein
the user information is associated with at least one of a state or an action of the user,
the user information includes at least one of position information of the user acquired from a position sensor of the plurality of sensors, or environment information of environment surrounding the user, and
the environment information is acquired from a camera of the plurality of sensors;
acquiring the environment information from a camera of the plurality of sensors of the on user's information processing device; (This should be a step)
determining an action of a virtual character in a virtual space linked to the user information detected in the real space; and
controlling a voice of the virtual character from a speaker based on the determined action of the virtual character, wherein
the voice of the virtual character is controlled to indicate, to the user, an object in the real space,
the user information detected in the real space includes object information of the object, and
the object is visible to the user in the real space.

12. A non-transitory computer-readable medium having stored thereon, computer-executable instructions which, when executed by a computer, cause the computer to execute operations, the operations comprising:
acquiring sensor information associated with a user from a plurality of sensors of a user's neckband type information processing device;
detecting user information in a real space based on the acquired sensor information, wherein
the user information is associated with at least one of a state or an action of the user,
the user information includes at least one of position information of the user acquired from a position sensor of the plurality of sensors, or environment information of environment surrounding the user, and
the environment information is acquired from a camera of the plurality of sensors;
determining an action, of a virtual character in a virtual space, linked to the user information detected in the real space; and
controlling a voice of the virtual character from a speaker based on the determined action of the virtual character, wherein
the voice of the virtual character is controlled to indicate, to the user, an object in the real space,
the user information detected in the real space includes object information of the object, and
the object is visible to the user in the real space.

* * * * *